(12) United States Patent
Kang et al.

(10) Patent No.: US 11,076,433 B2
(45) Date of Patent: Jul. 27, 2021

(54) DYNAMIC SUBBAND-BASED SIGNAL TRANSCEIVING METHOD AND APPARATUS THEREFOR IN WIRELESS COMMUNICATION SYSTEM

(71) Applicant: LG Electronics Inc., Seoul (KR)

(72) Inventors: Jiwon Kang, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/093,878

(22) PCT Filed: Nov. 16, 2016

(86) PCT No.: PCT/KR2016/013184
§ 371 (c)(1),
(2) Date: Oct. 15, 2018

(87) PCT Pub. No.: WO2017/179784
PCT Pub. Date: Oct. 19, 2017

(65) Prior Publication Data
US 2019/0090284 A1   Mar. 21, 2019

Related U.S. Application Data

(60) Provisional application No. 62/322,768, filed on Apr. 14, 2016.

(51) Int. Cl.
*H04W 74/08* (2009.01)
*H04L 5/00* (2006.01)
(Continued)

(52) U.S. Cl.
CPC ....... *H04W 74/0891* (2013.01); *H04L 5/0044* (2013.01); *H04L 27/2602* (2013.01);
(Continued)

(58) Field of Classification Search
CPC ......... H04L 5/001; H04L 5/0057; H04L 1/18; H04L 1/1812; H04L 1/189; H04L 1/1896;
(Continued)

(56) References Cited

U.S. PATENT DOCUMENTS 8,223,872 B1 * 7/2012 Zhang ............... H04L 25/03343
375/267
2005/0025039 A1 * 2/2005 Hwang .................. H04L 5/023
370/206
(Continued)

FOREIGN PATENT DOCUMENTS

WO   WO2013012213 A1   1/2013
WO   WO2015005724 A1   1/2015

OTHER PUBLICATIONS

International Search Report in International Application No. PCT/KR2016/013184, dated Feb. 22, 2017, 17 pages.

*Primary Examiner* — Natasha W Cosme
(74) *Attorney, Agent, or Firm* — Fish & Richardson P.C.

(57) ABSTRACT

Disclosed is a method for a terminal for transceiving a signal with a base station in a wireless communication system. Specifically, the method comprises the steps of: receiving, from the base station, information regarding one or more extended subbands by means of a base subband; transmitting a random access preamble to the base station by means of a particular extended subband from among the base subband or one or more extended subbands; receiving, from the base station, a random access response corresponding to the random access preamble by means of the particular extended subband; and transmitting an uplink signal and receiving a downlink signal by means of the particular extended subband, wherein the base subband and said one or more extended subbands differ from each other by one or more from among the subcarrier spacing, unit scheduling time, and bandwidth.

15 Claims, 13 Drawing Sheets

(51) Int. Cl.
*H04L 27/26* (2006.01)
*H04W 56/00* (2009.01)
*H04W 72/04* (2009.01)
*H04W 80/02* (2009.01)

(52) U.S. Cl.
CPC ..... *H04W 56/001* (2013.01); *H04W 72/0446* (2013.01); *H04W 72/0453* (2013.01); *H04W 74/0833* (2013.01); *H04L 5/001* (2013.01); *H04W 80/02* (2013.01)

(58) Field of Classification Search
CPC ..... H04L 5/0023; H04L 5/0035; H04L 5/005; H04L 5/006; H04L 27/2602; H04L 47/801; H04L 5/0007; H04L 5/0044; H04L 5/0048; H04L 5/0053; H04L 5/0092; H04J 11/0093
USPC ........................................................ 370/329
See application file for complete search history.

(56) References Cited

U.S. PATENT DOCUMENTS

| | | | |
|---|---|---|---|
| 2012/0163223 A1* | 6/2012 | Lo | H04L 5/0062 370/252 |
| 2014/0098761 A1 | 4/2014 | Lee et al. | |
| 2015/0103761 A1 | 4/2015 | Chen et al. | |
| 2015/0245378 A1 | 8/2015 | Kim et al. | |

* cited by examiner (A) CONTROL-PLANE PROTOCOL STACK (B) USER-PLANE PROTOCOL STACK

DYNAMIC SUBBAND-BASED SIGNAL TRANSCEIVING METHOD AND APPARATUS THEREFOR IN WIRELESS COMMUNICATION SYSTEM

CROSS-REFERENCE TO RELATED APPLICATIONS

This application is a National Stage application under 35 U.S.C. § 371 of International Application No. PCT/KR2016/013184, filed on Nov. 16, 2016, which claims the benefit of U.S. Provisional Application No. 62/322,768, filed on Apr. 14, 2016. The disclosures of the prior applications are incorporated by reference in their entirety.

TECHNICAL FIELD

The present invention relates to a wireless communication system, and more particularly, to a method for transmitting and receiving signals based on a flexible subband configuration in a wireless communication system and apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the above discussion, proposed are a method for transmitting and receiving signals based on a flexible subband configuration in a wireless communication system and apparatus therefor.

Technical Solution

In an aspect of the present invention, provided herein is a method for transmitting and receiving signals to and from a Base Station (BS) by a User Equipment (UE) in a wireless communication system. The method may include: receiving information about one or more extended subbands from the BS on a base subband; transmitting a random access preamble to the BS on the base subband or a specific extended subband among the one or more extended subbands; receiving a random access response in response to the random access preamble from the BS on the specific extended subband; and performing transmission of an uplink signal and reception of a downlink signal on the specific extended subband. In this case, the base subband and the one or more extended subbands may differ in at least one of the following properties: subcarrier spacings, scheduling time units, and bandwidths.

In another aspect of the present invention, provided herein is a User Equipment (UE) in a wireless communication system. The UE may include a wireless communication module and a processor. In this case, the processor may be configured to: receive information about one or more extended subbands from a Base Station (BS) on a base subband; transmit a random access preamble to the BS on the base subband or a specific extended subband among the one or more extended subbands; and perform transmission of an uplink signal and reception of a downlink signal on the specific extended subband after receiving a random access response in response to the random access preamble from the BS on the specific extended subband. The base subband and the one or more extended subbands may differ in at least one of the following properties: subcarrier spacings, scheduling time units, and bandwidths.

Preferably, when the random access preamble is transmitted on the base subband, information indicating the specific extended subband among the one or more extended subbands may be transmitted together with the random access preamble.

Alternatively, when the random access preamble is transmitted on the base subband, the random access preamble may include information indicating the specific extended subband among the one or more extended subbands.

Alternatively, when the random access preamble is transmitted on the specific extended subband, the specific extended subband may be selected from among the one or more extended subbands. In this case, the specific extended subband may be selected based on characteristics of the uplink and downlink signals.

Additionally, a synchronization signal may be received on the base subband, and synchronization with the BS may be achieved based on the synchronization signal.

Advantageous Effects

According to the present invention, a UE can efficiently transmit and receive signals based on a flexible subband configuration.

It will be appreciated by persons skilled in the art that that the effects that can be achieved through the present invention are not limited to what has been particularly described hereinabove and other advantages of the present invention will be more clearly understood from the following detailed description.

BEST MODE FOR INVENTION

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In the present disclosure, a base station (eNB) may be used as a broad meaning including a remote radio head (RRH), an eNB, a transmission point (TP), a reception point (RP), a relay, etc.

Figure 1:
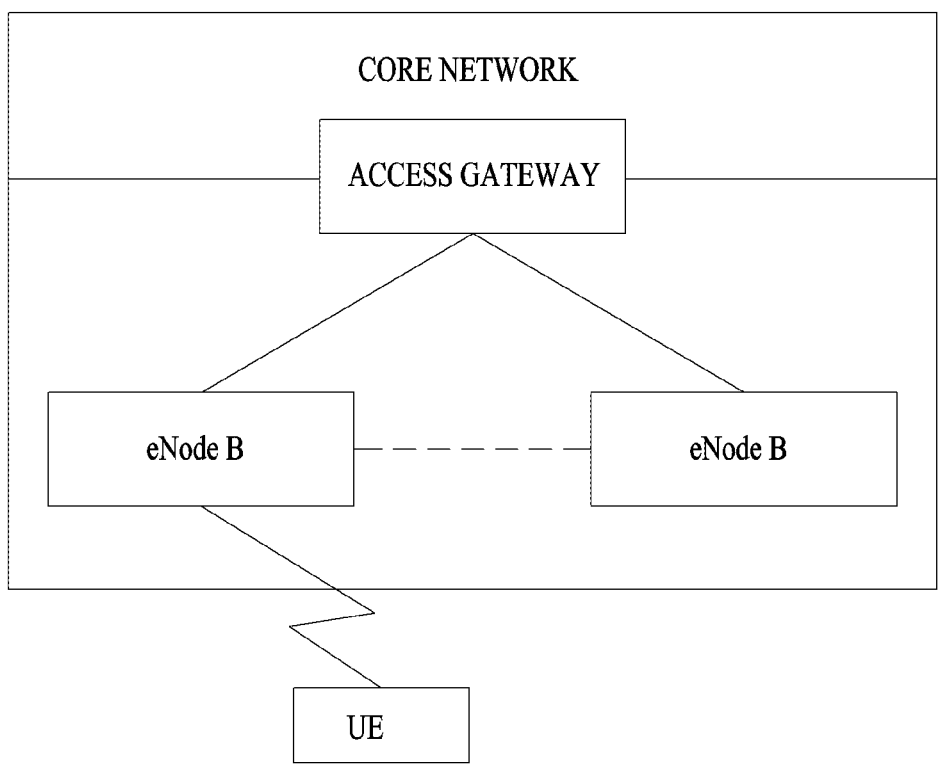
FIG. 1 is a diagram schematically illustrating a network structure of an E-UMTS as an exemplary radio communication system.
Figure 2:
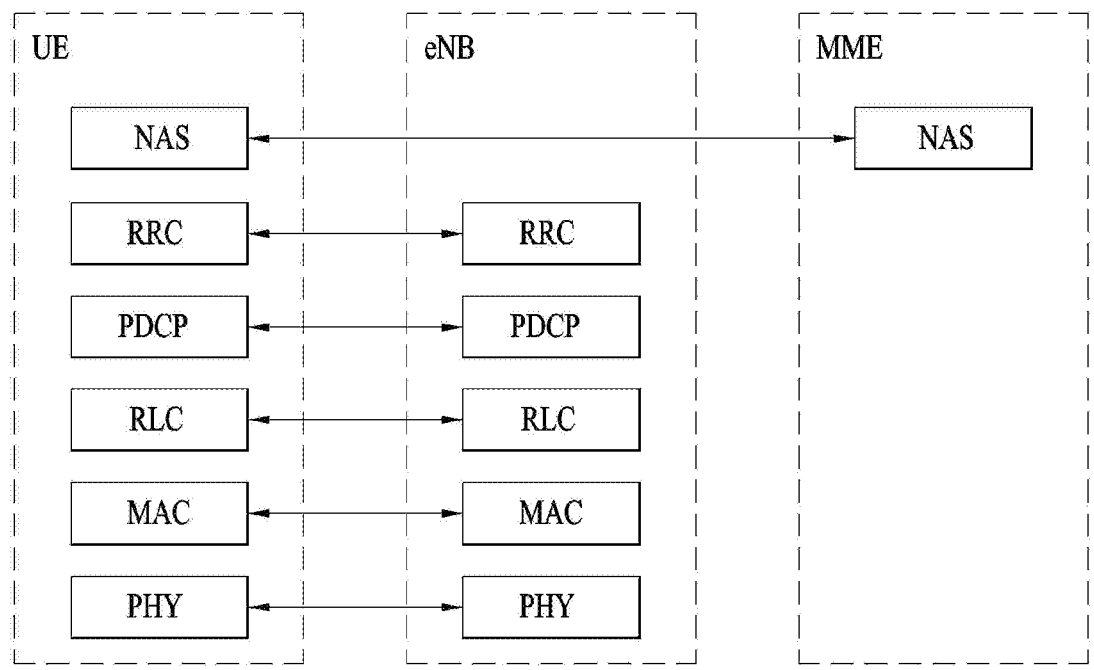
FIG. 2 is a diagram illustrating structures of a control plane and a user plane of a radio interface protocol between a UE and an E-UTRAN based on the 3GPP radio access network specification.
Figure 2:
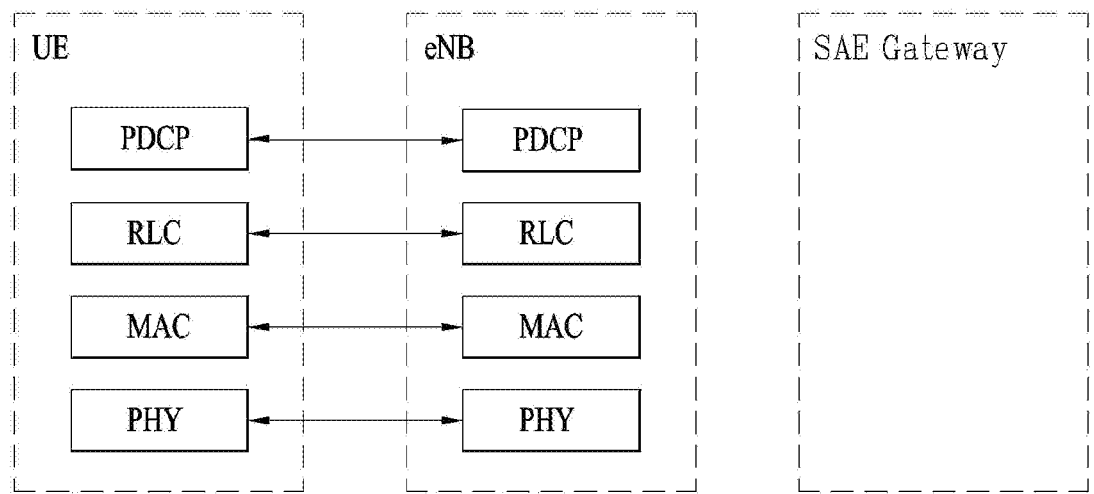

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
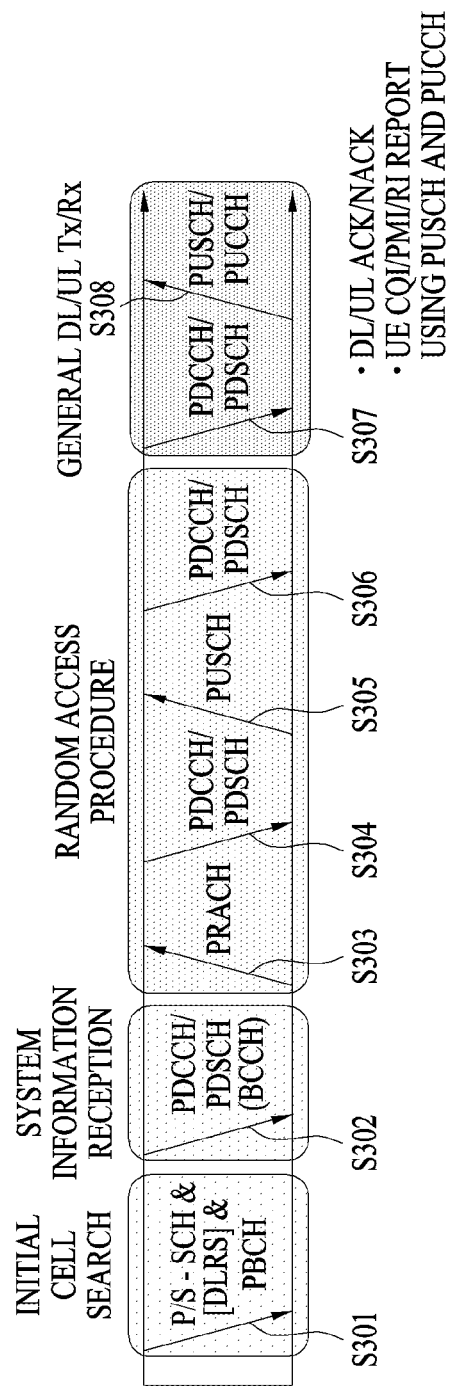
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
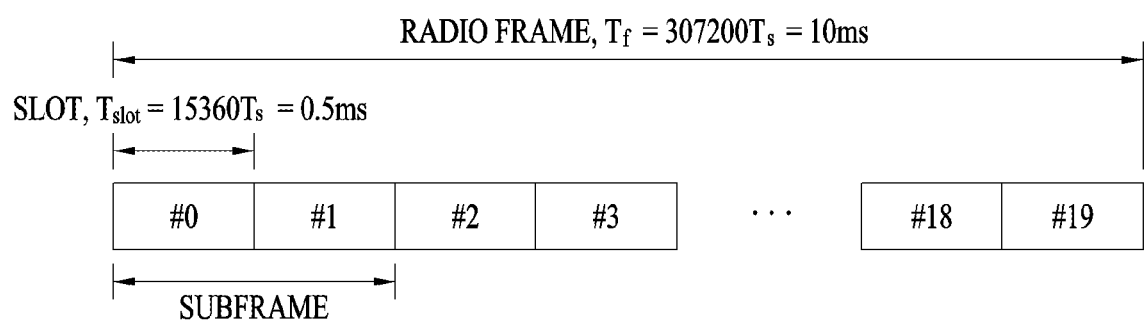
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×$10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
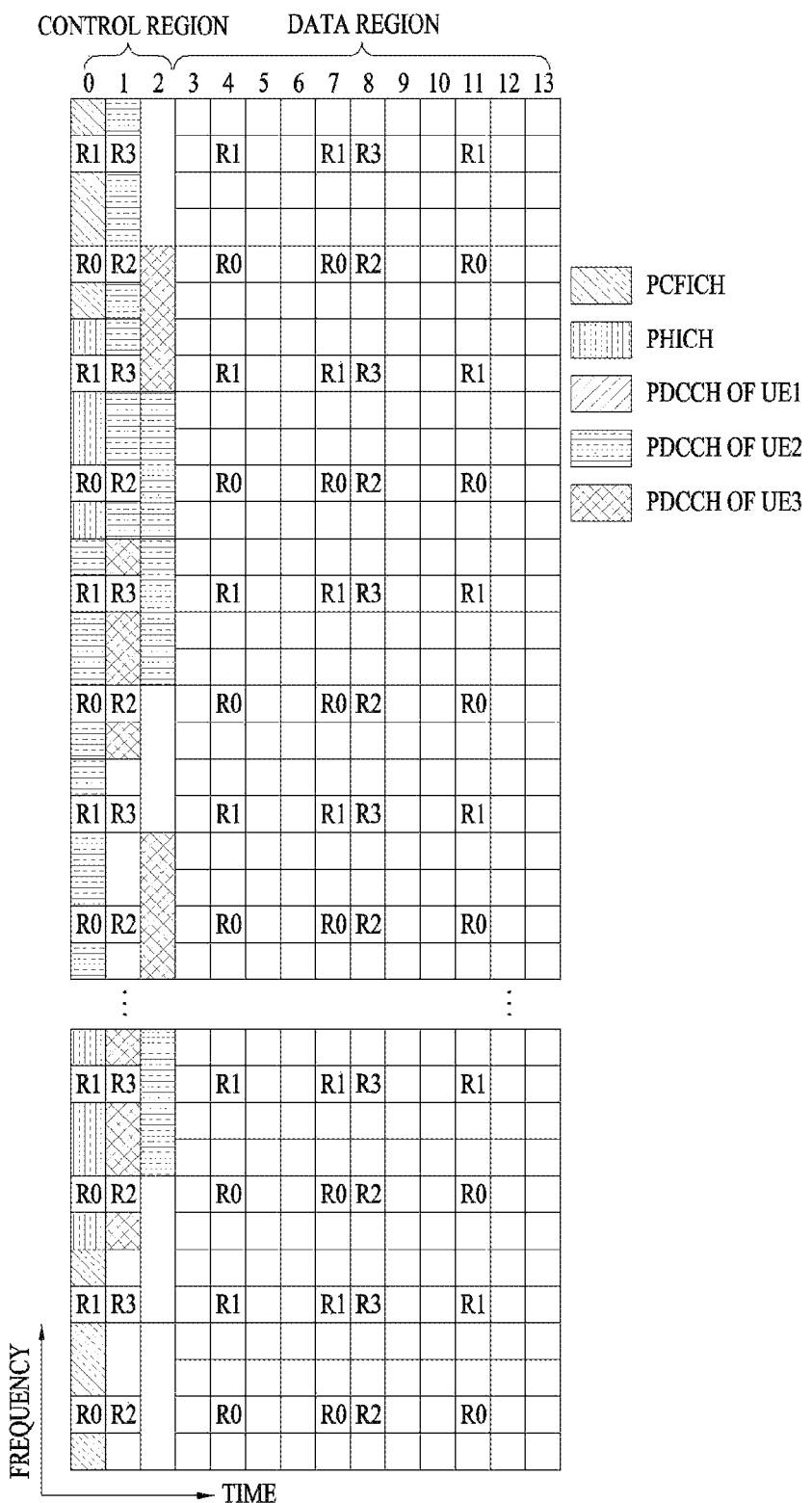
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
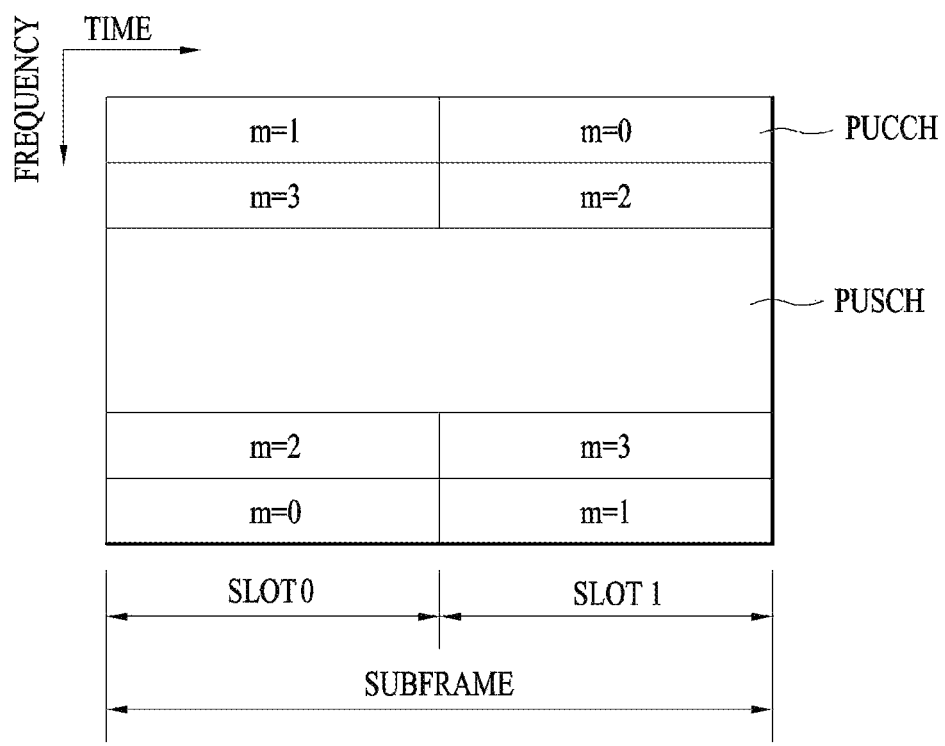
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Figure 7:
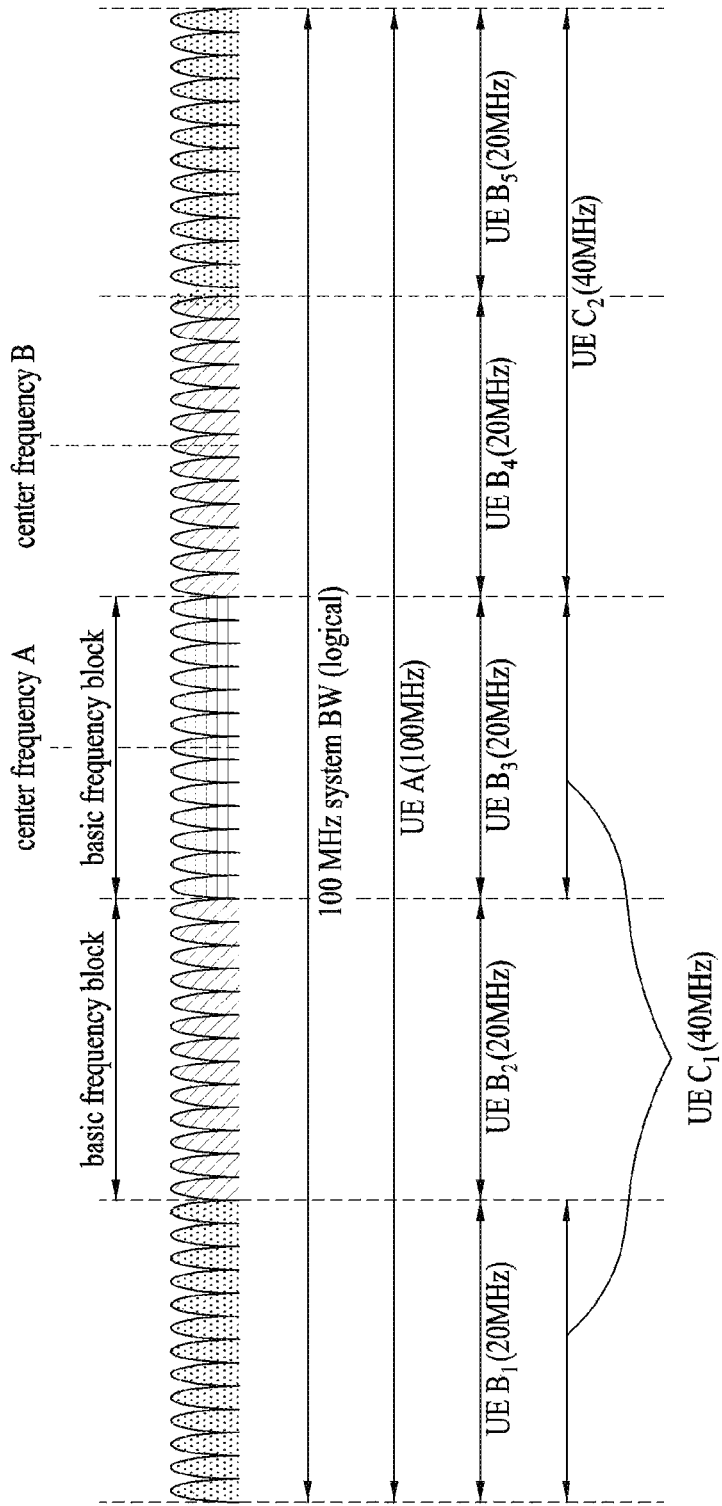
FIG. 7 is a conceptual diagram for explaining carrier aggregation.

Hereinafter, a carrier aggregation scheme will be described. FIG. 7 is a conceptual diagram for explaining carrier aggregation.

The carrier aggregation means a method by which a UE uses a plurality of frequency blocks or (logical) cells, each of which is composed of uplink resources (or component carriers) and/or downlink resources (or component carriers), as one large logical frequency band in order to achieve a wider frequency band in a wireless communication system. Hereinafter, for convenience of description, the term "component carrier" is commonly used.

Referring to FIG. 7, the entire system bandwidth (BW) has a maximum of 100 MHz as a logical bandwidth. The entire system BW includes five component carriers, each having a maximum bandwidth of 20 MHz. A component carrier includes one or more physically consecutive subcarriers. Although FIG. 7 shows that all component carriers have the same bandwidth, this is merely an example. In other words, each component carrier may have a different bandwidth. In addition, although FIG. 7 shows that component carriers are adjacent to each other in the frequency domain, it is only to show a logical concept. Thus, component carriers can be physically adjacent to each other or located apart from each other.

For component carriers, different center frequencies may be used, or one common center frequency may be used for physically adjacent component carriers. For example, assuming all component carriers are physically adjacent to each other in FIG. 7, center frequency A may be used. On the contrary, assuming that component carriers are not physically adjacent to each other, center frequency A, center frequency B, and the like may be used for the individual component carriers.

In this specification, a component carrier may mean the system band of a legacy system. If a component carrier is defined with respect to a legacy system, it is possible to provide backward compatibility and facilitate system design in a wireless communication environment where evolved UEs coexist with legacy UEs. For example, when the LTE-A system supports the carrier aggregation, each component carrier may corresponds to the system band of the LTE system. In this case, the component carrier may have any one of bandwidths of 1.25, 2.5, 5, 10, and 20 MHz.

When the entire system BW is extended through the carrier aggregation, a frequency band used for communication with each UE is defined on a component carrier basis. In this case, UE A may use 100 MHz corresponding to the entire system BW and perform communication using all five component carriers. UEs $B_1$ to $B_5$ may use 20 MHz bandwidth only and perform communication using one component carrier. UEs $C_1$ and $C_2$ may use 40 MHz bandwidth only and perform communication using two component carries. The two component carriers may or may not be logically/physically adjacent to each other. Here, UE $C_1$ uses two component carriers that are not adjacent to each other, and UE $C_2$ uses two adjacent component carriers.

Figure 8:
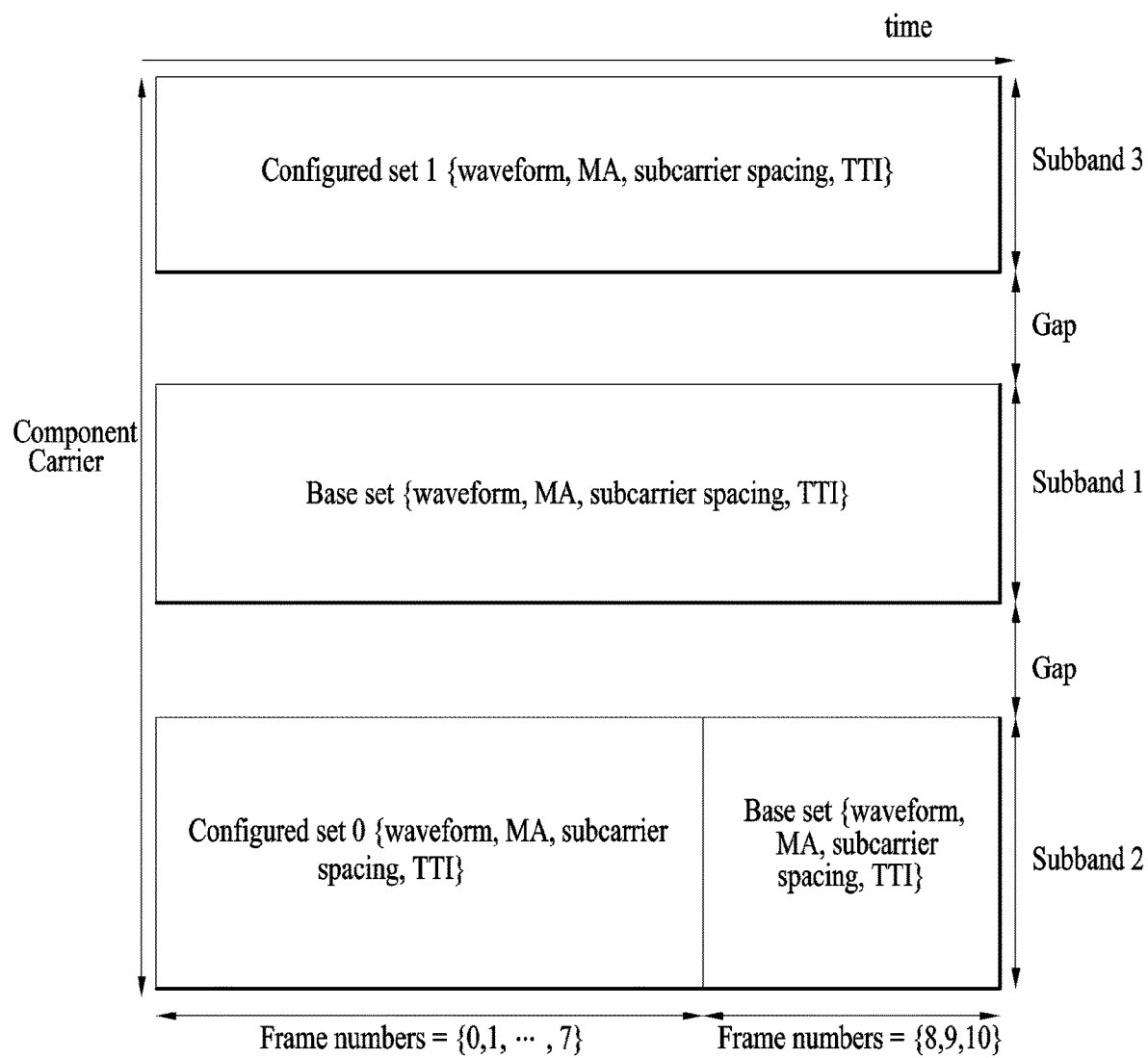
FIG. 8 illustrates an example of applying a flexible subband configuration according to the first embodiment of the present invention.

The LTE system may use one downlink component carrier and one uplink component carrier, whereas the LTE-A system may use a plurality of component carriers as shown in FIG. 8. A downlink component carrier or a combination of a downlink component carrier and an uplink component carrier corresponding to the downlink component carrier may be referred to as a cell. In this case, a relationship between downlink and uplink component carriers can be indicated through system information.

At this time, a method for scheduling a data channel through a control channel can be classified into a linked carrier scheduling method and a cross carrier scheduling method.

Specifically, according to the linked carrier scheduling, a control channel transmitted on a specific component carrier schedules only a data channel through the specific component carrier as in the legacy LTE system using a single component carrier. That is, a downlink/uplink grant transmitted in a PDCCH region of a downlink component carrier of a specific component carrier (or cell) can schedule only the PDSCH/PUSCH of a cell including the corresponding downlink component carrier. In other words, a search space where downlink/uplink grant detection is attempted is present in the PDCCH region of the cell where the PDSCH/PUSCH corresponding to a scheduling target is located.

On the other hand, according to the cross carrier scheduling, a control channel transmitted on a primary Component Carrier (CC) by using a Carrier Indicator Field (CIF) schedules a data channel transmitted on the primary CC or another CC. In other word, in the cross carrier scheduling, a monitored cell (or a monitored CC) is set, and a downlink/uplink grant transmitted in a PDCCH region of the monitored cell schedules the PDSCH/PUSCH of a cell configured to be scheduled by the corresponding cell. That is, a search space for a plurality of CCs is present in the PDCCH region of the monitored cell. The PCell is set among the plurality of cells to transmit system information, attempt initial access, and transmit uplink control information. The PCell is composed a downlink primary CC and an uplink primary CC corresponding to the downlink primary CC.

The current cellular system has evolved from 4G to 5G. For use of the 5G communication system, the requirements for supporting not only conventional enhanced mobile broadband (eMBB) services based on smartphones but also various Internet of Things (IoT) application services such as health care, disaster and safety management, vehicle communication, manufacturing plant control, robot control, etc. have been defined. In supporting the IoT application services, how much time is required for data transmission and how reliably data transmission can be performed become more important than the data transmission rate, which has been considered as a main issue in the prior art. In 3GPP, such a service is named as Ultra-Reliable Low Latency Communication (URLLC). In addition, a communication service provided in an environment where multiple terminals such as sensors are concentrated in a specific area is sorted as massive Machine-Type Communication (mMTC). Moreover, a vehicle to everything (V2X) communication service is also considered as a differentiated service.

Considering that a 5G air interface should be able to provide various services, various design methods have been considered for the 5G air interface. In particular, from the perspective of physical layer design, different signal/channel design methods can be applied such that a waveform, a multiple access scheme, and a numerology (e.g., subcarrier spacing, Transmit (or transmission) Time Interval (TTI), bandwidth, subframe duration, etc.) vary per case. To apply independent design methods to various cases, a method for configuring a different time/frequency resource per case has been mainly considered.

Specifically, N1 subbands, each having a different physical-layer design method (numerology, waveform, multiple access scheme, etc.) are defined in a specific downlink CC, and N2 subbands, each having a different physical-layer design method, are defined in an uplink CC. Since each subband prefers an optimized design method to satisfy different requirements (for example, latency, spectral efficiency, UE battery efficiency, coverage, etc.), different physical-layer design methods are applied. In addition, physical layers can be designed per case by assuming N1=N2 on the premise that mapping is performed based on a paring between uplink and downlink subbands.

In addition, in the case of TDD or if uplink CCs are paired with downlink CCs one by one even in the case of FDD, it is possible to assume that the ratios between frequency resource regions for uplink and downlink subbands and some numerologies (e.g., subcarrier spacing, TTI, subframe duration, etc.) are the same.

In the above-described subframe structure, a UE should perform communication on a subband suitable for service characteristics, and the simplest way is that the UE initiates the communication on the corresponding subband when accessing a Base Station (BS). However, it is not desirable in terms of efficient use of frequency resources that a BS always allocates a specific subband for a specific service in a fixed manner, and thus, the present invention proposes methods for configuring a flexible subband configuration by considering various situations such as traffic, service requirements, etc. Moreover, the present invention proposes physical-layer frames, signals, channel configurations, and random access schemes for a UE for the flexible subband configuration.

First Embodiment

The first embodiment of the present invention proposes that the first subbands of downlink and uplink CCs have the following characteristics.

1) The base waveform, base multiple access scheme, and base numerology, which are defined for the frequency region where a corresponding CC is included, are applied. Here, the base numerology at least includes a subcarrier spacing and a Transmission Time Interval (TTI). In particular, in the case of the TTI, the subframe corresponding to the scheduling time unit of the current LTE system may be used, or it may be replaced with a slot or a mini-slot. Here, the mini-slot means a slot with a reduced length for low latency, which has been proposed in the recent standardization.

2) The first downlink subband is configured such that it includes a predefined frequency resource region of a corresponding CC, and a synchronization signal, a broadcast channel and/or a common control channel is transmitted in the predefined frequency resource region with a specific periodicity. The predefined frequency resource region may be composed of a few or tens of Resource Blocks (RBs) located at the bottom or top of the center frequency.

System information is broadcast in a cell through a broadcast channel and/or a common control channel. In this case, the system information may include frequency region information of the first to $N1^{th}$ downlink subbands and frequency region information of the first to $N2^{th}$ uplink subbands. This information may be common for both uplink and downlink.

In particular, when subband information is transmitted, the subbands can be divided into available and unavailable subbands and signaled UE-specifically. In addition, it can be extended to the time domain such that time/frequency resources are divided into available and unavailable time/frequency resource and signaled UE-specifically.

Additionally, the frequency region information may be differently configured per time region. For example, a specific subband can be defined such that it exists during a certain period P with a specific periodicity T. As another example, assuming that a time region has the following requirement: $nT<t \leq P+nT$ (where n is an integer greater than 0), N1 may be set to 3. And, N1 may be set to 2 in other time regions. As described above, the subband existing only in a specific time period can be efficiently used for a service where communication is performed at a fixed time of day such as an mMTC service. In addition, in the time region where the specific subband exists and the time regions where the specific subband does not exist, each subband of the CC may have a different frequency region. This can be defined by a predetermined rule or configured through separate information.

The system information may include at least one of waveforms, multiple access schemes, and numerology-related information of the second to $N1^{th}$ downlink subbands and at least one of waveforms, multiple access schemes, and numerology-related information of the second to $N2^{th}$ uplink subbands. This information may be common for uplink and downlink. Additionally, the corresponding information may contain information on a valid time region.

For example, the subcarrier spacing information and TTI information of the second subband may be included. And, the corresponding information may indicate that it is valid only for a specific subframe index or a specific frame index. In other subframes or frames where the corresponding information is not valid, the subcarrier spacing and TTI included in the base numerology are applied to corresponding subbands.

FIG. 8 illustrates an example of applying a flexible subband configuration according to the first embodiment of the present invention.

Referring to FIG. 8, it can be seen that the second subband is configured to be valid only for frame indices #0 to #7. In addition, it can be seen that in frame indices #8 to #10, the base set of subband 2 has the same features as those of the base set of subband 1.

Moreover, the system information may include gap information for cancelling frequency interference between consecutive subbands, and each subband may have different gap information. Further, the system information may include configuration information on a PRACH region, which is a physical channel necessary for a UE to send a random access request. In this case, the PRACH region may be configured ① only for the first subband or ② for each subband. The two cases will be described in detail later.

Additionally, when a plurality of sectors or beam regions are defined in a cell, a scanning signal for determining a sector or beam region that a UE will use for data transmission is transmitted on the first downlink subband.

3) The waveform, multiple access scheme, and numerology configured by the system information transmitted on the first subband are applied to not only the second to $N1^{th}$ subbands of the downlink CC but also the second to $N2^{th}$ subbands of the uplink CC. Here, the base numerology at least includes the subcarrier spacing and TTI.

Second Embodiment

The second embodiment of the present invention proposes that a UE obtains downlink time/frequency synchronization and system information from a downlink synchronization signal and/or a broadcast channel (and/or a common control channel) which is transmitted in a predefined resource region of a downlink CC with the base waveform and base subcarrier spacing and then acquires subband configuration information from the obtained downlink time/frequency synchronization and system information. The predefined frequency resource region may be composed of a few or tens of RBs located at the top or bottom of the center frequency.

Specifically, the frequency region information of the first to $N1^{th}/N2^{th}$ subbands of a corresponding uplink/downlink CC is obtained from the system information. In this case, it is possible to acquire time region information of a specific subband. In particular, in a time region where the specific subband exists and time regions where the specific subband does not exist, each subband of the CC may have a different frequency region. This can be defined by a predetermined rule or configured through separate information.

In addition, at least one of the waveforms, multiple access schemes, numerology related information of the second to $N1^{th}/N2^{th}$ subbands of the uplink/downlink CC can be obtained from the system information. Moreover, information on a time region where the corresponding information is valid can be obtained. Further, information on a gap between consecutive subbands can also be obtained from the system information.

Additionally, the UE may acquire the time/frequency synchronization from the second to the $N1^{th}$ subbands based on the time/frequency synchronization obtained from the first subband.

If a plurality of sectors or beam regions are defined in a corresponding cell, the UE determines a preferred sector or beam region based on a signal transmitted on the first subband and then feedback corresponding information to a BS.

Third Embodiment

The third embodiment of the present invention proposes that when a UE intends to performs a random access procedure for access to a BS, uplink synchronization, and Scheduling Request (SR), etc. after obtaining system information from the BS, the UE performs either method 1 or method 2.

Method 1.

The UE transmits a preamble in a PRACH region defined in the first subband of an uplink CC. In this case, the UE transmits information on a preferred subband on which the UE desires to receive a random access response from the BS (for example, a subband index) together with the preamble (according to the characteristics of a desired service). The preferred subband information can be explicitly delivered to the BS in the form of a separate field, or it can be implicitly delivered through the time/frequency resource location of the preamble or sequence group information. When method 1 is applied, operation is performed using the base TTI before PRACH transmission. Thereafter, operation can be performed using a TTI configured for the preferred subband.

Method 2.

The UE selects an uplink subband (according to the characteristics of a desired service) and transmits a preamble in a PRACH region defined in the corresponding subband. When method 2 is applied, operation can be performed using a TTI configured for the preferred subband at the time when PRACH transmission is performed.

Hereinafter, details of methods 1 and 2 are described with reference to the accompanying drawings.

Figure 9:
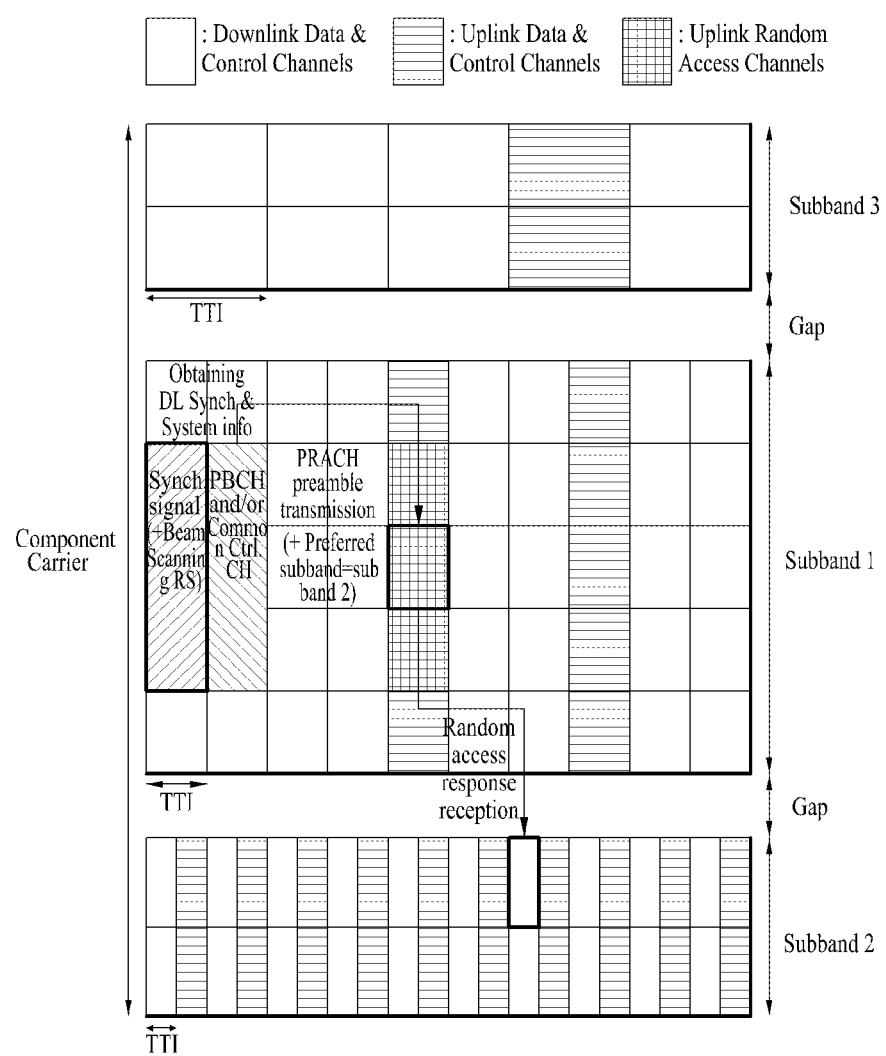
FIG. 9 illustrates an example where in a TDD system, a PRACH region is configured according to method 1 of the third embodiment of the present invention.

FIG. 9 illustrates an example where in a TDD system, a PRACH region is configured according to method 1 of the third embodiment of the present invention. In particular, it is assumed in FIG. 9 that the PRACH region is located only at the first uplink subband.

Referring to FIG. 9, one CC is divided into three subbands (for example, subbands 1 to 3), and subband 2 has the smallest TTI (or the shortest subframe length). If a specific UE desires to receive URLLC services, the UE transmits a preamble through a PRACH of subband 1 after obtaining downlink synchronization and system information from subband 1. In this case, the UE may transmit, to a BS, information on a preferred subband (i.e., subband 2) together with the preamble either explicitly or implicitly as described above.

In response to such a random access request, the BS transmits a response message through downlink subband 2 that the UE prefers. Thereafter, the BS performs subsequent uplink and downlink transmission using the preferred subband, i.e., subband 2 so that the BS can perform the operation with a shorter TTI (or a shorter subframe length) than that of subband 1.

Figure 10:
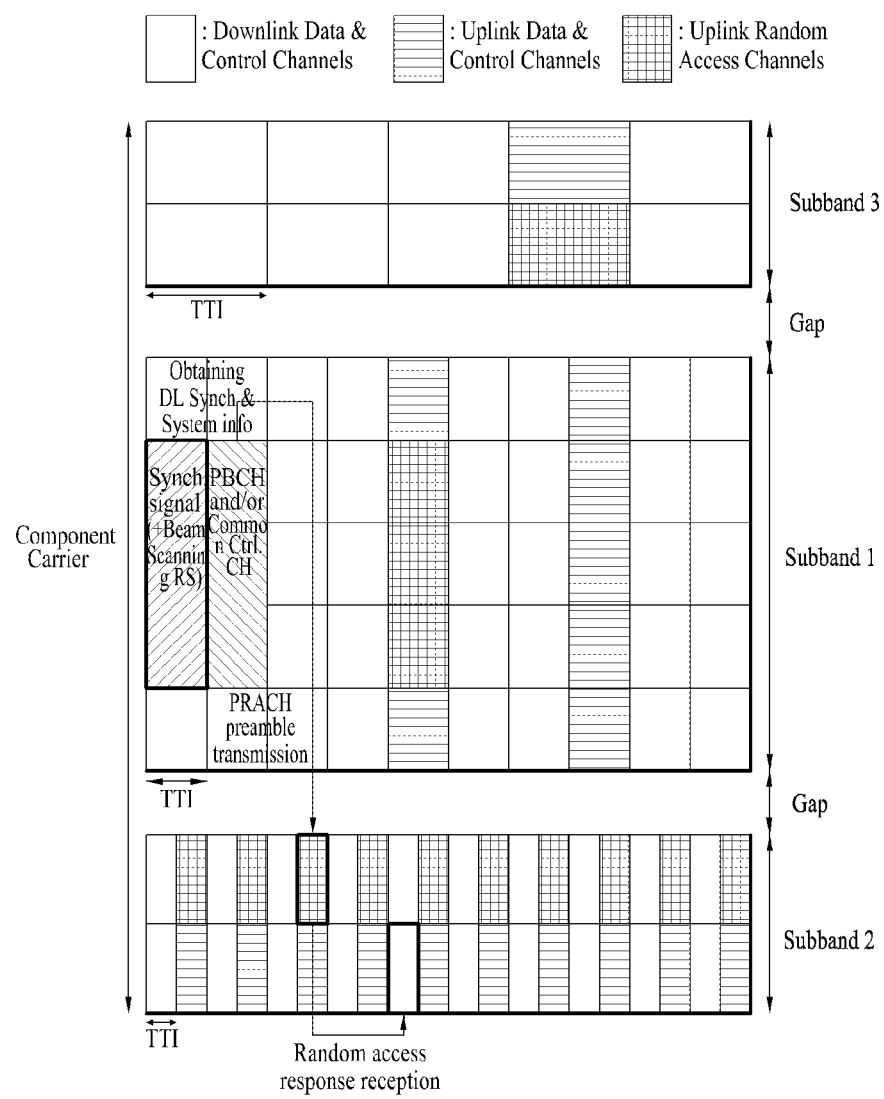
FIG. 10 illustrates an example where in a TDD system, a PRACH region is configured according to method 2 of the third embodiment of the present invention.

FIG. 10 illustrates an example where in a TDD system, a PRACH region is configured according to method 2 of the third embodiment of the present invention. In particular, it is assumed in FIG. 10 that the PRACH region is located at all uplink subbands.

Referring to FIG. 10, one CC is divided into three subbands (for example, subbands 1 to 3), and subband 2 has the smallest TTI (or the shortest subframe length). If a specific UE desires to receive URLLC services, the UE obtains downlink synchronization and system information from subband 1 and then transmits a preamble on a PRACH configured in subband 2, which the UE prefers.

In response to such a random access request, a BS transmits a response message through subband 2 that the UE prefers. Thereafter, the BS performs subsequent uplink and downlink transmission using subband 2. By doing so, the BS can perform the operation with a shorter TTI (or a shorter subframe length) than that of subband 1.

Figure 11:
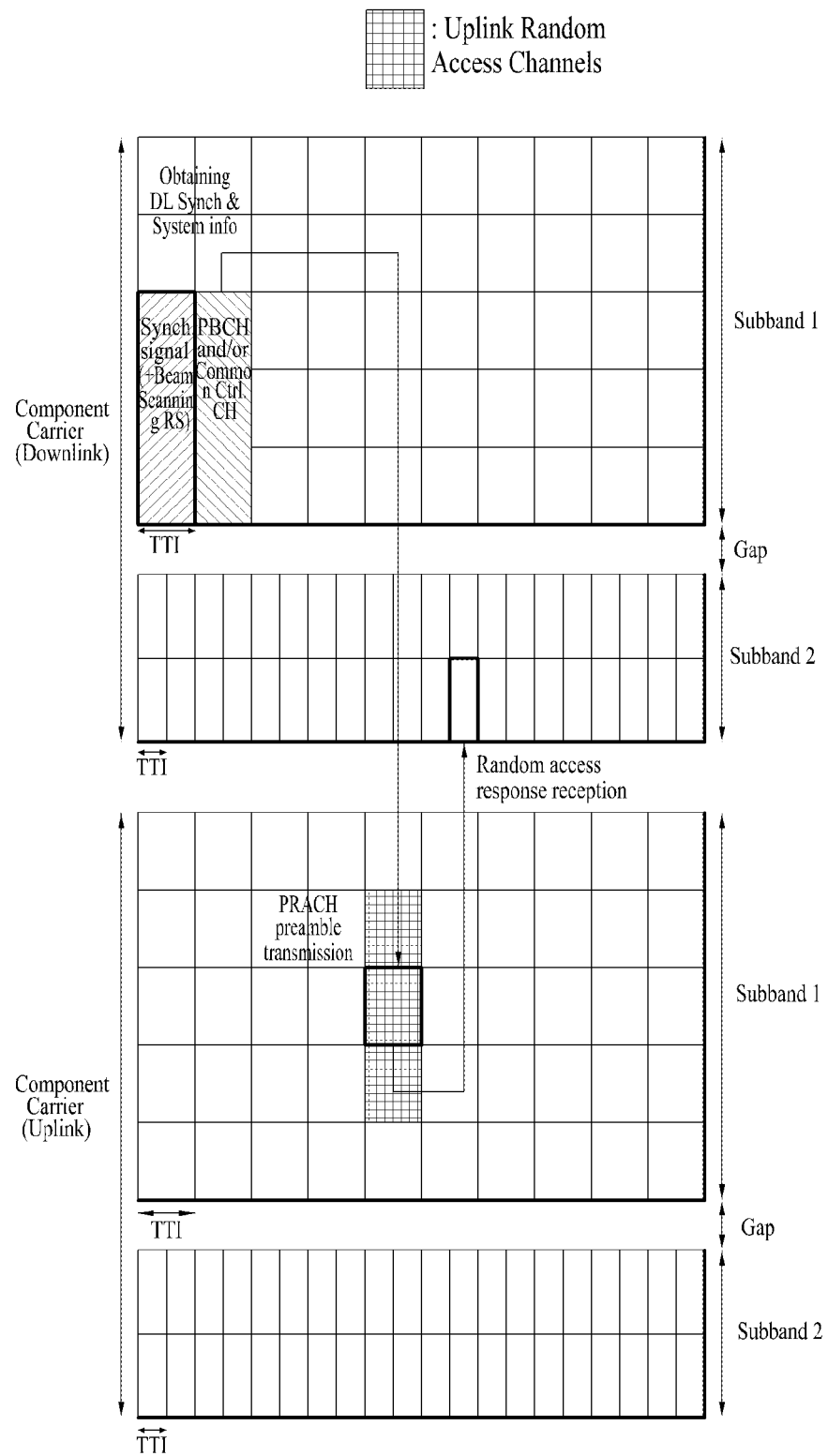
FIG. 11 illustrates an example where in an FDD system, a PRACH region is configured according to method 1 of the third embodiment of the present invention.

FIG. 11 illustrates an example where in an FDD system, a PRACH region is configured according to method 1 of the third embodiment of the present invention. In particular, the operation of FIG. 11 is equal to that of FIG. 9 except that a PRACH is transmitted on the first subband of an uplink CC.

Figure 12:
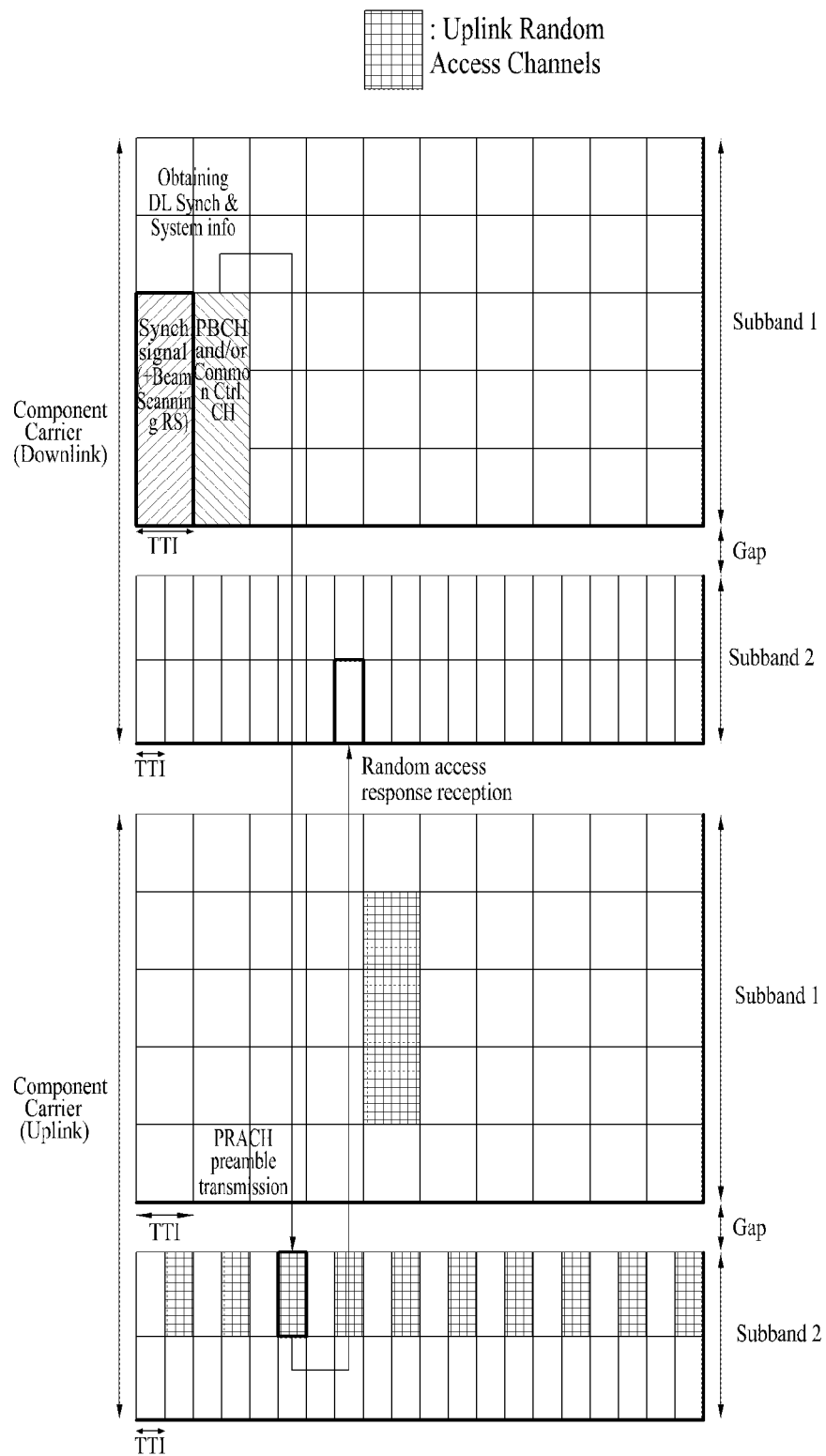
FIG. 12 illustrates an example where in an FDD system, a PRACH region is configured according to method 2 of the third embodiment of the present invention.

FIG. 12 illustrates an example where in an FDD system, a PRACH region is configured according to method 2 of the third embodiment of the present invention. In particular, the operation of FIG. 12 is equal to that of FIG. 10 except that a PRACH is transmitted on a preferred subband (i.e., subband 2) of an uplink CC.

In the above examples, a random access response message may contain a Timing Advance (TA) value for achieving uplink synchronization. The TA value can be commonly applied to all uplink subbands.

Additionally, in the present invention, system information may not only mean a Master Information Block (MIB) and a System Information Block (SIB) of the LTE system but be defined as a random higher-layer message.

Figure 13:
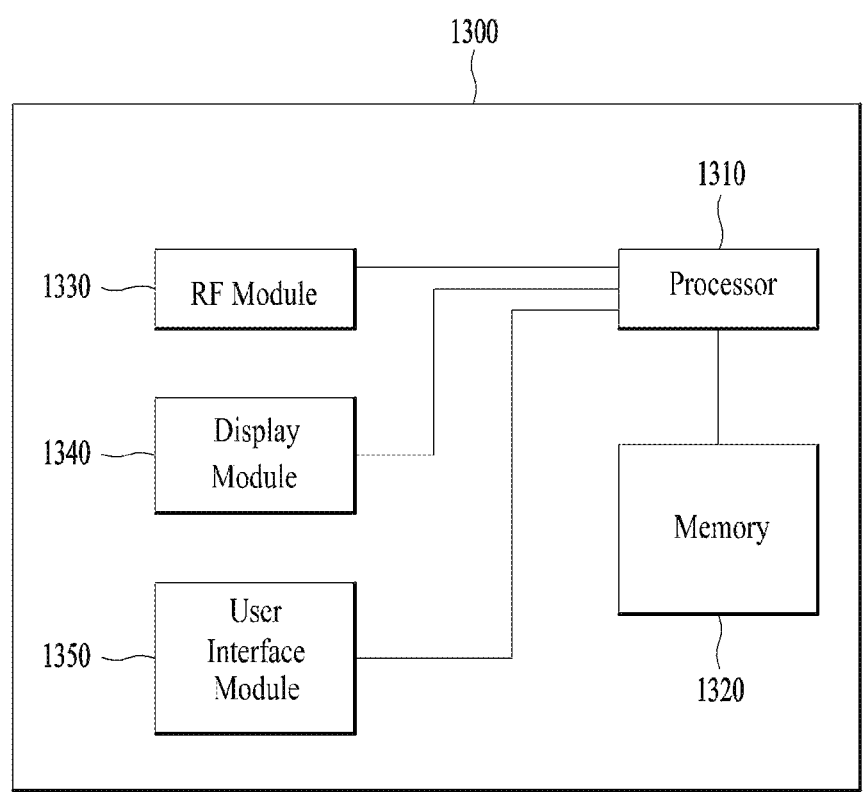
FIG. 13 is a block diagram of a communication apparatus according to an embodiment of the present invention.

FIG. 13 is a block diagram of a communication apparatus according to an embodiment of the present invention.

Referring to FIG. 13, a communication apparatus 1300 includes a processor 1310, a memory 1320, a Radio Frequency (RF) module 1330, a display module 1340 and a user interface module 1350.

The communication apparatus 1300 is shown for convenience of description and some modules thereof may be omitted. In addition, the communication apparatus 1300 may further include necessary modules. In addition, some modules of the communication apparatus 1300 may be subdivided. The processor 1310 is configured to perform an operation of the embodiment of the present invention described with respect to the drawings. For a detailed description of the operation of the processor 1310, reference may be made to the description associated with FIGS. 1 to 12.

The memory 1320 is connected to the processor 1310 so as to store an operating system, an application, program code, data and the like. The RF module 1330 is connected to the processor 1310 so as to perform a function for converting a baseband signal into a radio signal or converting a radio signal into a baseband signal. The RF module 1330 performs analog conversion, amplification, filtering and frequency up-conversion or inverse processes thereof. The display module 1340 is connected to the processor 1310 so as to display a variety of information. As the display module 1340, although not limited thereto, a well-known device such as a Liquid Crystal Display (LCD), a Light Emitting Diode (LED), or an Organic Light Emitting Diode (OLED) may be used. The user interface module 1350 is connected to the processor 1310 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the method for transmitting and receiving signals based on a flexible subband configuration in a wireless communication system and apparatus therefor are described based on the 3GPP LTE system, the method and apparatus can be applied to various wireless communication systems as well as the 3GPP LTE system.

What is claimed is:

1. A method for communicating with a Base Station (BS) by a User Equipment (UE) in a wireless communication system, the method comprising:
receiving, from the BS, a signal block including (i) a synchronization signal and (ii) system information;
transmitting a random access preamble on a first subband to the BS; and
receiving a random access response on a second subband from the BS,
wherein a subcarrier spacing for the first subband and a subcarrier spacing for the second subband are acquired separately based on the system information, and wherein the subcarrier spacing for the first subband and the subcarrier spacing for the second subband are independent from each other.

2. The method of claim 1, wherein the signal block is received based on a default subcarrier spacing.

3. The method of claim 1, wherein a random access preamble configuration is acquired based on the system information.

4. The method of claim 1, wherein the signal block is received from the BS via a broadcast channel or a common control channel.

5. The method of claim 1, wherein the random access preamble is transmitted to the BS via a Physical Random Access Channel (PRACH) on the first subband.

6. An apparatus configured to perform wireless communications, the apparatus comprising:
at least one processor; and
at least one computer memory operably connectable to the at least one processor and storing instructions that, based on being executed by the at least one processor, perform operations comprising:
receiving, from a base station (BS), a signal block including (i) a synchronization signal and (ii) system information;
transmitting a random access preamble on a first subband to the BS; and
receiving a random access response on a second subband from the BS,
wherein a subcarrier spacing for the first subband and a subcarrier spacing for the second subband are acquired separately based on the system information, and
wherein the subcarrier spacing for the first subband and the subcarrier spacing for the second subband are independent from each other.

7. The apparatus of claim 6, wherein the signal block is received based on a default subcarrier spacing.

8. The apparatus of claim 6, wherein a random access preamble configuration is acquired based on the system information.

9. The apparatus of claim 6, wherein the signal block is received from the BS via a broadcast channel or a common control channel.

10. The apparatus of claim 6, wherein the random access preamble is transmitted to the BS via a Physical Random Access Channel (PRACH) on the first subband.

11. A User Equipment (UE) configured to perform wireless communications, the UE comprising:
at least one transceiver;
at least one processor; and
at least one computer memory operably connectable to the at least one processor and storing instructions that, based on being executed by the at least one processor, perform operations comprising:
receiving, from a base station (BS) through the at least one transceiver, a signal block including (i) a synchronization signal and (ii) system information;
transmitting a random access preamble on a first subband to the BS through the at least one transceiver; and
receiving a random access response on a second subband from the BS through the at least one transceiver,
wherein a subcarrier spacing for the first subband and a subcarrier spacing for the second subband are acquired separately based on the system information, and
wherein the subcarrier spacing for the first subband and the subcarrier spacing for the second subband are independent from each other.

12. The UE of claim 11, wherein the signal block is received based on a default subcarrier spacing.

13. The UE of claim 11, wherein a random access preamble configuration is acquired based on the system information.

14. The UE of claim 11, wherein the signal block is received from the BS via a broadcast channel or a common control channel.

15. The UE of claim 11, wherein the random access preamble is transmitted to the BS via a Physical Random Access Channel (PRACH) on the first subband.

* * * * *